US010886035B2

(12) United States Patent
Sica et al.

(10) Patent No.: US 10,886,035 B2
(45) Date of Patent: Jan. 5, 2021

(54) ENERGY CABLE HAVING A CROSSLINKED ELECTRICALLY INSULATING LAYER, AND METHOD FOR EXTRACTING CROSSLINKING BY-PRODUCTS THEREFROM

(71) Applicants: Prysmian S.p.A., Milan (IT); Politecnico Di Milano, Milan (IT)

(72) Inventors: Rodolfo Sica, Milan (IT); Dario Bartolini, Milan (IT); Attilio Citterio, Milan (IT)

(73) Assignees: Prysmian S.p.A., Milan (IT); Politecnico Di Milano, Milan (IT)

( * ) Notice: Subject to any disclaimer, the term of this patent is extended or adjusted under 35 U.S.C. 154(b) by 0 days.

(21) Appl. No.: 16/643,716

(22) PCT Filed: Sep. 4, 2017

(86) PCT No.: PCT/IB2017/055301
§ 371 (c)(1),
(2) Date: Mar. 2, 2020

(87) PCT Pub. No.: WO2019/043440
PCT Pub. Date: Mar. 7, 2019

(65) Prior Publication Data
US 2020/0211732 A1    Jul. 2, 2020

(51) Int. Cl.
*H01B 9/02*    (2006.01)
*H01B 3/44*    (2006.01)
(Continued)

(52) U.S. Cl.
CPC ............. *H01B 3/443* (2013.01); *H01B 3/006* (2013.01); *H01B 7/0009* (2013.01)

(58) Field of Classification Search
CPC .................................................... H01B 9/027
(Continued)

(56) References Cited

U.S. PATENT DOCUMENTS 5,985,008 A * 11/1999 Tom ........................ F17C 11/00
96/108
2012/0202033 A1 * 8/2012 Chang ..................... H01M 4/14
428/219
(Continued)

FOREIGN PATENT DOCUMENTS

WO      98/52197       11/1998
WO   WO 2015-059520  *  4/2015
WO      2016/170391 A1  10/2016

OTHER PUBLICATIONS

Elliott P. Barrett et al., "The Determination of Pore Volume and Area Distributions in Porous Substances. I. Computations from Nitrogen Isotherms", The Journal of American Society, 73, Jan. 1951, pp. 373-380.

(Continued)

*Primary Examiner* — Chau N Nguyen
(74) *Attorney, Agent, or Firm* — Element IP, PLC

(57) ABSTRACT

The present invention relates to an energy cable comprising a cable core comprising an electric conductor and a crosslinked electrically insulating layer, wherein the cable core further comprises a microporous material having a bimodal pore volume distribution with a first peak of the distribution having a maximum at a pore diameter value within the range 5.5-6.5 Å and a second peak of the distribution having a maximum at a pore diameter value within the range 7.5-8.5 Å, the maximum values of the first and the second peak corresponding to an incremental pore volume of at least $4 \times 10^{-3}$ cm$^3$/g. The present invention also relates to a method for extracting methane crosslinking by-products from a crosslinked electrically insulating layer of an energy cable.

14 Claims, 5 Drawing Sheets

(51) Int. Cl.
*H01B 3/00* (2006.01)
*H01B 7/00* (2006.01)

(58) Field of Classification Search
USPC .................................................. 174/120 SC
See application file for complete search history.

(56) References Cited

U.S. PATENT DOCUMENTS

| 2013/0017141 A1 | 1/2013 | Cote et al. |
| 2014/0113811 A1 | 4/2014 | Stadie et al. |
| 2016/0268018 A1 | 9/2016 | Sica et al. |

OTHER PUBLICATIONS

T. Andrews et al., "The Role of Degassing in XLPE Power Cable Manufacture", IEEE Electrical Insulation Magazine, vol. 22, No. 6, Nov./Dec. 2006, pp. 5-16.
Wood, C.D. et al., "Microporous Organic Polymers for Methane Storage", Advanced Materials, 2008, vol. 20, pp. 1916-1921.
Errahali, M. et al., "Microporous Hyper-Cross-Linked Aromatic Polymers Designed for Methane and Carbon Dioxide Adsorption", J. Phys. Chem., C, 2014, vol. 118, pp. 28699-28710.
International Search Report and Written Opinion dated May 4, 2018 in Patent Application No. PCT/IB2017/055301.

* cited by examiner

ENERGY CABLE HAVING A CROSSLINKED ELECTRICALLY INSULATING LAYER, AND METHOD FOR EXTRACTING CROSSLINKING BY-PRODUCTS THEREFROM

BACKGROUND

The present invention relates to an energy cable having a crosslinked electrically insulating layer, and to a method for extracting crosslinking by-products therefrom.

Cables for transporting electric energy generally include at least one cable core. The cable core is usually formed by a conductor sequentially covered by an inner polymeric layer having semiconducting properties, an intermediate polymeric layer having electrically insulating properties, an outer polymeric layer having semiconducting properties. Cables for transporting medium voltage (MV) or high voltage (HV) electric energy generally include at least one cable core surrounded by a screen layer, typically made of metal or of metal and polymeric material. The screen layer can be made in form of wires (braids), of a tape helically wound around the cable core or a sheet longitudinally wrapped around the cable core.

The polymeric layers of the cable core are commonly made from a polyolefin-based crosslinked polymer, in particular crosslinked polyethylene (XLPE), or elastomeric ethylene/propylene (EPR) or ethylene/propylene/diene (EPDM) copolymers, also crosslinked, as disclosed, e.g., in WO 98/52197. The crosslinking step, carried out after extruding the polymeric material onto the conductor, gives the material satisfactory mechanical and electrical properties even under high temperatures both during conventional use and current overload.

The crosslinking process of polyolefin materials, particularly polyethylene (XLPE), requires the addition to the polymeric material of a crosslinking agent, usually an organic peroxide, and subsequent heating at a temperature to cause peroxide cleavage and reaction. For instance, dicumyl peroxide, one of the most common crosslinking agent used for cable insulation, forms methane (light by-product) and heavy by-products, mainly acetophenone and cumyl alcohol. These by-products can be highly detrimental for the dielectric and mechanical properties of the insulating layer. In particular, methane can constitute a health, safety issue due to its flammability during the jointing/installation procedures, and its pressure can harmfully build-up during cable operation (see, for example, Andrews et al., IEEE Electrical Insulation Magazine, November/December 2006—Vol. 22, No. 6, page 5). Therefore, the by-products should be removed as much as possible from the cable.

Methane and the other crosslinking by-products are generally removed by subjecting the cable core to a degassing process. The degassing step is time and energy consuming and is thus a costly operation in a cable manufacturing process. Degassing requires large heated chambers which must be well ventilated to avoid the build-up of flammable methane and ethane. The cable, typically wound onto cable drums, is normally degassed at temperature in the range of 50÷80° C., for time periods in the order of days or weeks depending on the cable insulation thickness. At degassing temperatures, thermal expansion and softening of the insulation can occur which may lead to undue deformation of the cable core layers, potentially resulting in cable failures.

In the state of the art, porous materials capable of reversibly capturing gaseous methane through physico-chemical adsorption are known. As reported, for example, by US 2013/0017141, typically, porous materials comprise: (i) microporous materials wherein the total pore volume is mainly due to pores having size less than 2 nm; (ii) mesoporous materials wherein the total pore volume is mainly due to pores having size between 2 nm and 50 nm; (iiii) macroporous materials wherein the total pore volume is mainly due to pores having pore size bigger than 50 nm.

Porous polymeric materials are also known in the art.

Wood C. et al., Adv. Mater., 2008, 20, 1916-1921 discusses a series of hypercrosslinked polymer networks synthesized by self-condensation of bis(chloro)methyl aromatic monomers such as dichloroxylene (DCX), and 4,4'-bis(chloromethyl)-1,1'-biphenyl (BCMBP). For methane storage an optimal pore size above 0.76 nm (the thickness of two methane molecules) has been suggested. The BCMBP/p-DCX powder (75/25) exhibited both the highest $CH_4$ uptake (5.2 mmol $g^{-1}$≈116 $cm^3 \cdot g^{-1}$ STP) at 20 bar/298 K as well as the highest apparent BET surface area (1904 $m^2 \cdot g^{-1}$). The micropore volume of the best sample (BCMBP/p-DCX powder 75/25) of 0.54 $cm^3/g$ is determined at 2 nm pore size. The lower $CH_4$ uptake for polymers produced from the DCX monomer can be attributed to their lower micropore volume and apparent BET surface areas.

The already mentioned US 2013/0017141 deals with porous structured organic film (SOF) for storing a gaseous entity. The pore size distribution in FIG. 3 indicates that two sizes of pores exist within in the SOF: about 6 angstroms (0.6 nm) and about 8.5 angstroms (0.85 nm). These pore sizes are appropriate to host gas molecules like hydrogen and methane.

Errahali M. et al., J. Phys. Chem., C 2014, 118, 28699-28710 reports that hyper-crosslinked polymers (HCPs) have been proposed for $H_2$, $CH_4$, and CO capture and adsorption and often exhibit high uptake capacities. The good performance of mPAF (microporous aromatic framework) materials can be attributed to the abundance of ultramicropores (centered around 0.58 nm). In particular, at 1 bar, the $CH_4$ adsorptions in mPAF-1/16 is 8 $cm^3$ (STP)/g (corresponding to 0.357 mmol/g at 273 k).

SUMMARY

The Applicant has faced the problem of eliminating the degassing process for removing methane by-product from the energy cable cores having a crosslinked insulating layer, or at least to reduce the duration of the same, so as to increase productivity and reduce manufacturing costs. The above goal should be achieved without increasing the complexity of the cable production process and, of course, without any detrimental effects on cable performance even after many years from installation.

The Applicant considered the use of microporous material for methane uptake, but the materials proposed in the art were capable of adsorbing significant amount of this gas at pressure and/or temperature unsuitable for treating an energy cable before putting it into operation. For example, the above cited Wood C. et al. discloses significant methane adsorption at a pressure of 20 bar, and Errahali M. et al. discloses significant methane adsorption at a temperature of 0° C.

The Applicant found that a material having a microporous structure with a predetermined bimodal distribution can irreversibly adsorb significant amount of methane at room temperature and pressure, such to substantially remove the methane or at least drastically abate its concentration in an energy cable core.

Therefore, according to a first aspect, the present disclosure relates to an energy cable comprising a cable core comprising an electric conductor and a crosslinked electrically insulating layer, wherein the cable core further comprises a microporous material having a bimodal pore volume distribution with a first peak having a maximum at a pore diameter value within the range 5.5-6.5 Å and a second peak having a maximum at a pore diameter value within the range 7.5-8.5 Å, the maximum values of the first and the second peaks corresponding to an incremental pore volume of at least $4 \times 10^{-3}$ cm$^3$/g.

According to a second aspect, the present disclosure relates to a method for extracting methane from a crosslinked electrically insulating layer of an energy cable, said method comprising the following sequential stages:

manufacturing an energy cable core comprising an electric conductor, a crosslinked electrically insulating layer containing methane as crosslinking by-product, and a microporous material having a bimodal pore volume distribution, with a first peak having a maximum at a pore diameter value within the range 5.5-6.5 Å and a second peak having a maximum at a pore diameter value within the range 7.5-8.5 Å, the maximum values of the first and the second peaks corresponding to an incremental pore volume of at least $4 \times 10^{-3}$ cm$^3$/g; and leaving the energy cable core to stand for a period of from 0.5 to 7 days to allow the methane crosslinking by-product migrating from the crosslinked electrically insulating layer to the microporous material and being adsorbed.

In an embodiment, the method of the present disclosure can further comprise a heating stage carried out during the stage of leaving the energy cable core to stand. The heating step can provide heating to a temperature up to 80° C. The heating temperature is evaluated in view of the methane adsorption capability of the specific microporous material employed. It has to be taken in account that while a temperature increase can promote the methane degassing from the crosslinked electrically insulating layer, on the other side it can decrease the methane adsorption capacity of the microporous material. The more suitable temperature for carrying out the step of leaving the energy cable core to stand can be selected by the skilled person in view of these opposing trends and of the amount of methane crosslinking by-product to be removed from the insulating layer before placing a metal screen and finishing the cable.

The presence of microporous adsorbent material in the vicinity of the crosslinked electrically insulating layer avoids using a degassing apparatus and reduces the procedure time for removing methane by-products.

For the purpose of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purposes of the present description and of the appended claims the term "medium voltage" generally means a voltage of between 1 kV and 35 kV, whereas "high voltage" means voltages higher than 35 kV.

As "electrically insulating layer" it is meant a covering layer made of a material having insulating properties, namely having a dielectric rigidity (dielectric breakdown strength) of at least 5 kV/mm, preferably of at least 10 kV/mm.

As "crosslinked electrically insulating layer" it is meant an insulating layer made of a crosslinked polymer.

For the purpose of the present description and of the claims that follow, as "irreversible adsorption" and the like it is meant that once adsorbed by the adsorbent material no substantial release of by-product is observed after the cable is enclosed within a hermetic sheath, such as, for example, a metallic screen.

As "core" or "cable core" it is meant the cable portion comprising an electrical conductor, an insulating layer surrounding said conductor and, optionally, at least one semiconducting layer, for example an inner semiconducting layer surrounding the conductor in a radially internal position with respect to the insulating layer and/or an outer semiconducting layer surrounding the insulating layer.

For the purpose of the present description and of the claims that follow, the term "in the cable core" means any position inside or in direct contact with at least one of the cable core components.

For the purpose of the present description and of the claims that follow, the term "bimodal pore volume distribution" referred to the microporous material means that such material has a pore volume distribution such that, when incremental pore volume is plotted as a function of pore diameter, the resulting function exhibits two main peaks (also referred to as "maxima" or "modes" herein).

For the purpose of the present description and of the claims that follow, the term "cumulative" refers to a pore volume distribution where for a pore diameter X (in abscissa, for example), the sum of the pore volume up to the dimension X is given (in ordinate, for example). Accordingly, the expression "cumulative pore volume referred to a pore diameter value X means the total volume of the pores having a diameter equal to or lower than X.

For the purpose of the present description and of the claims that follow, the term "incremental" refers to a pore volume distribution where for a pore diameter X (in abscissa, for example), the actual pore volume is given (in ordinate, for example). Accordingly, the expression "incremental pore volume" referred to a pore diameter value X means the total volume of the pores having a diameter equal to X.

For the purpose of the present description and of the claims that follow, the pore volume distribution is determined by nitrogen adsorption measurements applying the Barret-Joyner-Halenda (BJH) model. The BJH-model nitrogen adsorption-desorption isotherm is described by E. P. Barrett et al., "The Journal of American Society", 73, 373, (1951).

The cable of the present disclosure can have one, two or three cable cores.

According to a first embodiment, the electric conductor comprises a plurality of stranded electrically conducting filaments with the microporous material within voids among said filaments.

In some embodiments, the cable of the present disclosure comprises a cable core comprising at least one semiconducting layer.

The microporous material can be in form of particles or powder.

According to a second embodiment, the microporous material is in contact with the semiconducting layer, i.e. it is in direct contact with a layer surface and not embedded within and/or admixed to the polymer material that forms the semiconducting layer. In some embodiments, such semiconducting layer is an outer semiconducting layer surrounding and in contact with the crosslinked electrically insulating layer or the inner semiconducting layer surrounding and in contact with the electric conductor.

According to a third embodiment, the microporous material is into the semiconducting layer, i.e. it is embedded within and/or admixed to the polymer material that forms the semiconducting layer. In some embodiments, such semiconducting layer is the inner semiconducting layer surrounding and in contact with the electric conductor.

According to a fourth embodiment, the microporous material is both within voids among the filaments of the electric conductor and into or in contact with a semiconducting layer.

The microporous material of the present disclosure can be dispersed in or on a material of the cable core.

According to some embodiments, the microporous material is dispersed in a filling material. The filling material is preferably a polymeric filling material which can be provided in the cable core by a continuous deposition process, especially by extrusion or by pultrusion. The filling material is preferably a buffering filling material which is usually present among the filaments forming the electric conductor of an energy cable in order to avoid propagation of water or humidity that can penetrate within the cable conductor, especially when the cable is to be installed in very humid environments or under water. The buffering filling material generally comprises a polymeric material and a hygroscopic material, for example a compound based on an ethylene copolymer, for example an ethylene/vinyl acetate copolymer, filled with a water absorbing powder, for example sodium polyacrylate powder.

According to another embodiment, the microporous material is dispersed on the surface of a hygroscopic yarn or hygroscopic tape. Hygroscopic yarns are generally known in energy cables, in particular in contact with the conductor filaments and/or with the outer semiconducting layer, so as to provide water-blocking properties. The hygroscopic yarns are generally made from polymer filaments, e.g. polyester filaments, on which particles of a hygroscopic material, for instance polyacrylate salts, are deposited by means of an adhesive material, typically polyvinyl alcohol (PVA). Such yarns can be modified according to the present disclosure by depositing on the polymer filaments a mixture of hygroscopic particles and microporous material, for example in form of particles. For example, the polymer filaments can be moistened with a solution of an adhesive material, and then particles of the microporous material are sprinkled thereon and remain entrapped in the solution and, after drying, in the adhesive material.

A similar technique can be used to provide hygroscopic tapes including microporous material. The hygroscopic tapes commonly used in energy cables can be non-conductive, in case they are onto the cable screen, or they can be semiconducting (8, FIG. 2) when in contact with the outer semiconducting layer (5, FIG. 2). On the tapes, usually made from a non-woven fabric of polymer filaments, particles of a hygroscopic material, for instance polyacrylate salts, are deposited by means of an adhesive material, as mentioned above. Such tapes can be modified according to the present disclosure by depositing a mixture of hygroscopic particles and microporous material, for example in form of particles, on the non-woven fabric.

According to the above embodiments, it is apparent that the microporous material can be placed in the vicinity of the crosslinked electrically insulating layer by means of cable elements that are already usual components of energy cables, such as hygroscopic yarns or tapes or buffering filling materials, thus avoiding supplementing the cable with an additional component which would not be necessary for a conventional cable. This remarkably reduces cable manufacturing costs and time. The above advantage does not exclude the possibility of providing the energy cable with microporous adsorbent material by means of one or more additional components purposively placed into the cable to obtain extraction and adsorption of methane.

As regards the microporous adsorbent material suitable for the present disclosure, it can be selected from a wide range of materials as long as they have the above described bimodal pore volume distribution.

Non limiting examples of suitable microporous materials are: hyper-crosslinked polymers (HCPs); activated carbon; alumino-silicates of natural or synthetic origin, such as zeolites, silica, alumina, silica-alumina, and various other inorganic oxides; metal-organic frameworks (MOFs); porous aromatic frameworks (PAFs); covalent organic frameworks (COFs).

In some embodiments, the microporous adsorbent material is selected from hyper-crosslinked polymers and activated carbon.

For the purpose of the present description and of the claims that follow, the term "hyper-crosslinked polymer" indicates a polymer material having a permanent microporous structure resulting from an extensive chemical crosslinking that prevents the polymer chains from collapsing into a dense, nonporous state.

HCPs can be synthesized according to methods known in the art.

In some embodiments, the HCPs are obtained by Friedel-Crafts self-condensation of halomethyl-aromatics or hydroxomethyl-aromatics monomers in the presence of a halogenated metal catalyst (e.g. $FeCl_3$) and optionally of a crosslinking agent (e.g. formaldehyde dimethyl acetal (FDA)).

Examples of halomethyl-aromatics are: α-dichloroxylene (DCX), bis(chloromethyl)-1,1'-biphenyl (BCMBP), 1,3,5-tri (4-chloromethyl-phenyl)-benzene and tetraphenylmethane (TPM).

In some embodiments, the microporous material is a HCP prepared by reacting DCX and BCMBP in an organic solvent, in inert atmosphere and in the presence of $FeCl_3$.

In some embodiments, DCX and BCMBP, in a molar ratio of from 1:2 to 1:4, are dissolved in a halogenated solvent (for example, dichloroethane) at room temperature, then added with a catalyst (in a substantially equimolar amount with respect to DCX+BCMBP) and left to react at a temperature near to, but lower than the solvent boiling point, for from 1 to 3 days. After cooling, a solid is obtained, which is ground, then washed with one or more polar solvents. In an embodiment, more polar solvents are used for the washings and can be selected from water, methanol, ethyl ether. In an embodiment, the washing is carried out by a Soxhlet apparatus. In an embodiment, each washing is carried out for from 0.5 to 2 days. The solid product is than dried.

As regards the activated carbons, they can be commercial material or can be synthetized by known methods, as described, for example, in US 2015/0203356

In some embodiments, the pore volume distribution of the microporous material is characterized in that the second peak, having a maximum at a diameter value within the range 7.5-8.5 Å, has a maximum value higher than the maximum value of the first peak having a maximum at a diameter value within the range 5.5-6.5 Å, so that the incremental pore volume of the pores having a diameter within the range 7.5-8.5 Å is higher than that of the pores having a diameter within the range 5.5-6.5 Å.

Without wishing to be bound to any theory, it is believed that pores having a diameter value within the range 5.5-6.5 Å and within the range 7.5-8.5 Å are particularly suitable to irreversibly entrap methane molecules as these pore sizes corresponds approximately to the kinetic diameter of a single molecule and of two adjacent molecules of methane, respectively.

In some embodiments, the cumulative pore volume of the pores having a diameter up to 10 Å (1 nm) of the microporous material is of at least $50 \times 10^{-3}$ cm$^3$/g. By using a microporous material having such a volume of micropores, the methane uptake capacity of the material allows adding amounts of adsorbent material to the cable core such not to substantially alter the cable dimensions and weight.

As regards the amount of microporous adsorbent material in the vicinity of the crosslinked electrically insulating layer, it can vary within a wide range and mainly depends on the type of adsorbent material, the amount of methane to be eliminated, the thickness of the insulating layer, and the cable operating temperature. According to preliminary evaluations, assuming a final target of 3 mmol/kg of methane content in the insulating layer, a cable average operating temperature of 70° C., and the use of an adsorbent material having a cumulative pore volume of at least $50 \times 10^{-3}$ cm$^3$/g, the adsorbent material can be present in an amount of from 40 g/m to 45 g/m for an insulating layer having an inner diameter of 30.25 mm and an outer diameter of 73.80 mm; from 62 g/m to 66 g/m for an insulating layer having an inner diameter of 41.45 mm and an outer diameter of 93.05 mm; and from 98 g/m to 103 g/m for an insulating layer having an inner diameter of 57.80 mm and an outer diameter of 118.50 mm, the units being expressed as amount of particles of the adsorbent material (in grams) versus the length of the cable (in meters). In view of the above ranges and indications, the skilled person is able determine a suitable amount of particles of the adsorbent material to be added to a given insulation layer without undue burden.

As regards the crosslinked electrically insulating layer, it preferably comprises at least one polyolefin, more preferably at least one ethylene homopolymer or copolymer of ethylene with at least one alpha-olefin $C_3$-$C_{12}$, having a density from 0.910 g/cm$^3$ to 0.970 g/cm$^3$, more preferably from 0.915 g/cm$^3$ to 0.940 g/cm$^3$.

In some embodiments, the ethylene homopolymer or copolymer has a melting temperature ($T_m$) higher than 100° C. and/or a melting enthalpy ($\Delta H_m$) higher than 50 J/g.

In some embodiments, the ethylene homopolymer or copolymer is selected from: medium density polyethylene (MDPE) having a density from 0.926 g/cm$^3$ to 0.970 g/cm$^3$; low density polyethylene (LDPE) and linear low density polyethylene (LLDPE) having a density from 0.910 g/cm$^3$ to 0.926 g/cm$^3$; high density polyethylene (HDPE) having a density from 0.940 g/cm$^3$ to 0.970 g/cm$^3$. In an embodiment of the disclosure the crosslinked electrically insulating layer comprises LDPE.

In some embodiments, the polyolefin forming the crosslinked electrically insulating layer is crosslinked by reaction with an organic peroxide. The organic peroxide can have formula $R_1$—O—O—$R_2$, wherein $R_1$ and $R_2$, equal or different from each other, are linear or, preferably, branched alkyls $C_1$-$C_{18}$, aryls $C_6$-$C_{12}$, alkylaryls or arylalkyls $C_7$-$C_{24}$. In a preferred embodiment, the organic peroxide is selected from: dicumyl peroxide, t-butyl cumyl peroxide, 2,5-dimethyl-2,5-di(t-butyl peroxy)hexane, di-t-butyl peroxide, or mixtures thereof.

Preferably, the organic peroxide is added to the polyolefin in an amount of from 0.05% to 8% by weight, more preferably from 0.1% to 5% by weight.

The crosslinked electrically insulating layer may further comprise an effective amount of one or more additives, selected e.g. from: antioxidants, heat stabilizers, processing aids, antiscorching agents, inorganic fillers.

The cable according to the present disclosure may further include at least one semiconducting layer. The semiconducting layer is preferably formed by a crosslinked polymeric material, more preferably the same crosslinked polyolefin used for the electrically insulating layer, and at least one conductive filler, for example a carbon black filler. The conductive filler is generally dispersed within the crosslinked polymeric material in a quantity such as to provide the material with semiconducting properties, namely to obtain a volumetric resistivity value, at room temperature, of less than 500 am, for example less than 20 am. Typically, the amount of carbon black can range between 1 and 50% by weight, for example between 3 and 30% by weight, relative to the weight of the polymer.

The production of the energy cable according to the present disclosure can be carried out according to known techniques, particularly by extrusion of the electrically insulating layer and of the at least one semiconducting layer over the electric conductor.

According to an embodiment, the electric conductor is formed by a plurality of stranded electrically conducting filaments and with the microporous material within voids among said filaments.

Alternatively, the microporous material may be preferably deposited on at least one hygroscopic yarn in contact with the stranded electrically conducting filaments. In an embodiment, the hygroscopic yarn carrying the microporous material is wound onto the electric conductor, and then the inner semiconducting layer is disposed thereupon.

According to another embodiment, the microporous material may be dispersed in a filling material and the filling material containing the microporous material is extruded or pultruded on the electric conductor so as to fill voids among the conductor filaments.

According to another embodiment, the hygroscopic tape carrying the microporous material is wound onto an outer semiconducting layer disposed over the electrically insulating layer.

The cable core, devoid of the metal screen, is left to stand so as to cause migration of the methane crosslinking by-products from the crosslinked electrically insulating layer to the microporous adsorbent material, thereby the microporous material adsorbs and entraps the methane crosslinking by-products. Afterwards, a metal screen is placed around the energy cable core according to well-known techniques.

BRIEF DESCRIPTION OF THE DRAWING

Further characteristics will be apparent from the detailed description given hereinafter with reference to the accompanying drawings, in which.

DETAILED DESCRIPTION OF THE PREFERRED EMBODIMENTS

Figure 1:
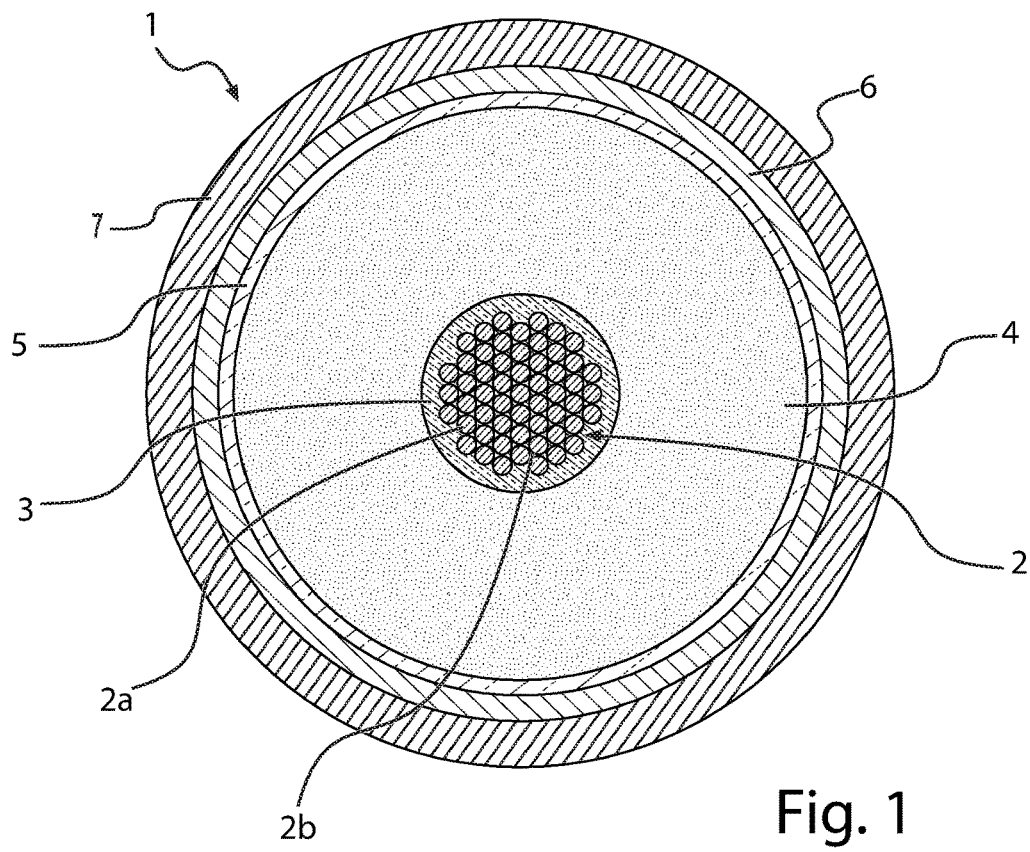
FIG. 1 is a transversal cross section of a first embodiment of an energy cable, particularly suitable for medium or high voltage, according to the present disclosure.

In FIG. 1, a transversal section of a first preferred embodiment of a cable (1) according to the present disclosure is schematically represented, which comprises an electric conductor (2), an inner semiconducting layer (3), an electrically insulating layer (4), an outer semiconducting layer (5), a metal screen (6) and a sheath (7). Electric conductor (2), inner semiconducting layer (3), electrically insulating layer (4) and outer semiconducting layer (5) constitute the core of cable (1). Cable (1) is particularly intended for the transport of medium or high voltage current.

The conductor (2) consists of metal filaments (2a), preferably of copper or aluminium or both, stranded together by conventional methods. The electrically insulating layer (4), the inner and outer semiconducting layers (3), (5) are made by extruding polymeric materials according to known techniques. Around the outer semiconducting layer (5), a metal screen layer (6) is usually positioned, made of electrically conducting wires or strips helically wound around the cable core or of an electrically conducting tape longitudinally wrapped and overlapped (preferably glued) onto the underlying layer. The electrically conducting material of said wires, strips or tape is usually copper or aluminium or both. The screen layer (6) may be covered by a sheath (7), generally made from a polyolefin, usually polyethylene, in particular high density polyethylene. In accordance with an embodiment of the present disclosure, the microporous adsorbent material, in form of particles or powder dispersed in a filling material, is within voids (2b) among said filaments (2a).

Figure 2:
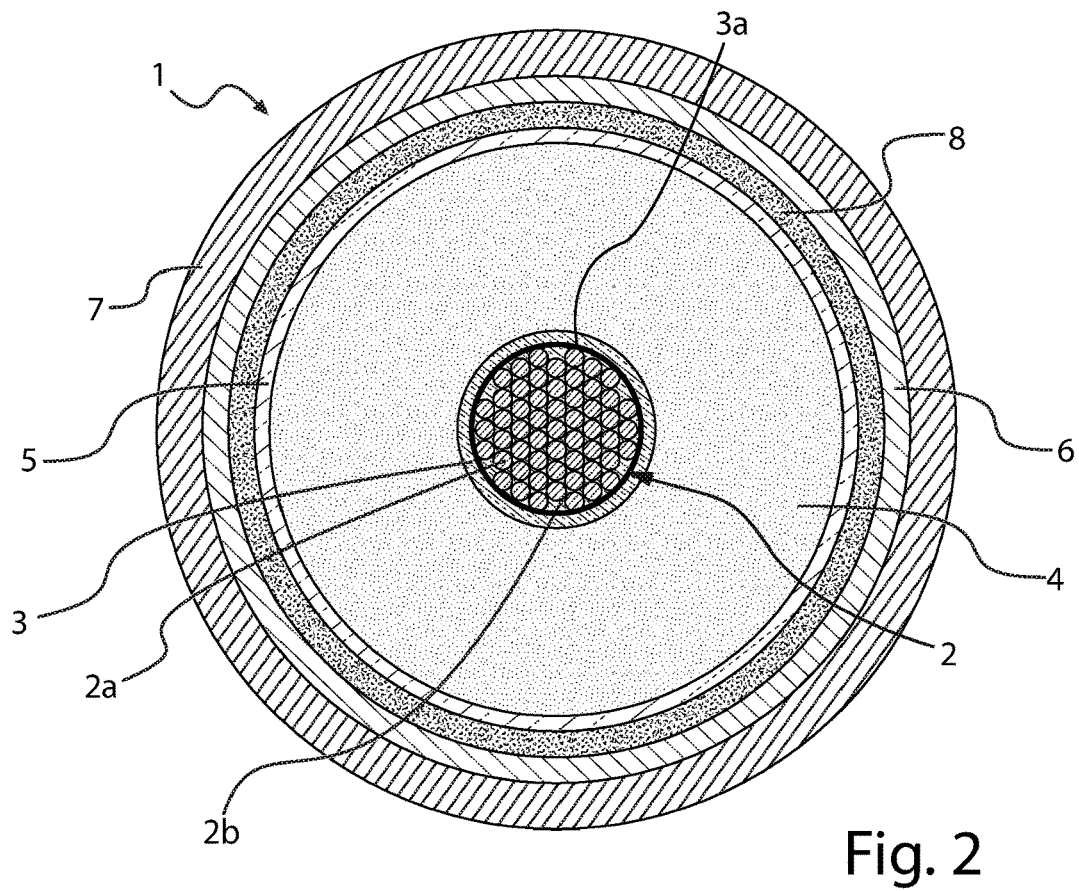
FIG. 2 is a transversal cross section of a second embodiment of an energy cable, particularly suitable for medium or high voltage, according to the present disclosure.

In FIG. 2, a transversal section of another embodiment of the cable (1) according to the present disclosure is schematically represented, which comprises the same elements as described in FIG. 1, with the addition of a hygroscopic tape (3a), wound onto the electric conductor (2), carrying particles of the microporous adsorbent material dispersed thereupon, as well as the semiconducting hygroscopic tape (8) in contact with the outer semiconducting layer (5).

In a further embodiment, particles of the microporous material may be dispersed in a filling material within voids (2b) among the metal filaments (2a) forming the electric conductor (2), analogously to what described in FIG. 1.

In another further embodiment, the inner semiconducting layer (3) of the cable (1) is in the form of a semiconductive tape wound around the electric conductor (2), such semiconductive tape carrying particles of the microporous adsorbent material.

FIGS. 1 and 2 show two embodiments of the present disclosure. Suitable modifications can be made to these embodiments according to specific technical needs and application requirements without departing from the scope of the disclosure.

The following examples are provided to further illustrate the content of the disclosure.

Example 1 (HCP 1)

A HCP microporous material according to the invention was prepared as follows.

In a round-bottom flask (equipped with magnetic stirrer, reflux condenser and thermometer), under nitrogen atmosphere, 1 mol of α-dichloroxylene (DCX) and 2.7 mol of 4,4'-bis(chloromethyl)-1,1'-diphenyl (BCMBP) were dissolved in 119 mol of dichloroethane (DCE), at room temperature (25° C.). 3.7 mol of $FeCl_3$ were then added to the reaction mixture, which was then heated at 80° C. for 48 h under nitrogen flow. After 48 h, a solid formed in the flask and HCl release ended. The solid product was left to cool, recovered from the flask and grounded, then sequentially washed with water, methanol and diethyl ether in a Soxhlet extractor (24 hours for each solvent). Finally, the product was dried in an oven at 60° C. for 24 hours.

Example 2 (HCP 2)

A comparative HCP microporous material was prepared as follows.

In a round-bottom flask (equipped with magnetic stirrer, reflux condenser and thermometer), under nitrogen atmosphere, 1 mol of α-dichloroxylene (DCX) and 3.19 mol of 4,4'-bis(chloromethyl)-1,1'-diphenyl (BCMBP) were placed. Separately, 4.16 mol of $FeCl_3$ were dissolved in 125 moles of dichloroethane. The resulting solution was added to the flask which was then heated at 80° C. for 18 h under nitrogen flow. Thereafter, a solid formed in the flask. The solid product was left to cool, recovered from the flask and washed, on a filter paper, with water and methanol up to discolouring, then with ethyl ether. Finally, the product was dried in an oven at 60° C. for 24 hours.

Examples 3 (Activated Carbon 1)

An activated carbon (Maxsorb® MSC-30, commercially available by Kansai Coke & Carbon) and having a pore volume distribution according to the present disclosure was used as adsorbent material.

Examples 4 (Activated Carbon 2)—Comparative

An activated carbon (Centaur®, commercially available by Chemviron) and having a pore volume distribution that does not fall within the present disclosure was used as adsorbent material for comparative purposes.

Characterization of the Materials of Examples 1-4

Samples of the materials of Examples 1 to 4 were characterized by using a for TriStar II Plus+MicroActive surface area and porosity analyzer (by Micromeritics) by determining the adsorption isotherms of $N_2$ at about −196° C., from 0.1 to 1 bar.

Figure 3A:
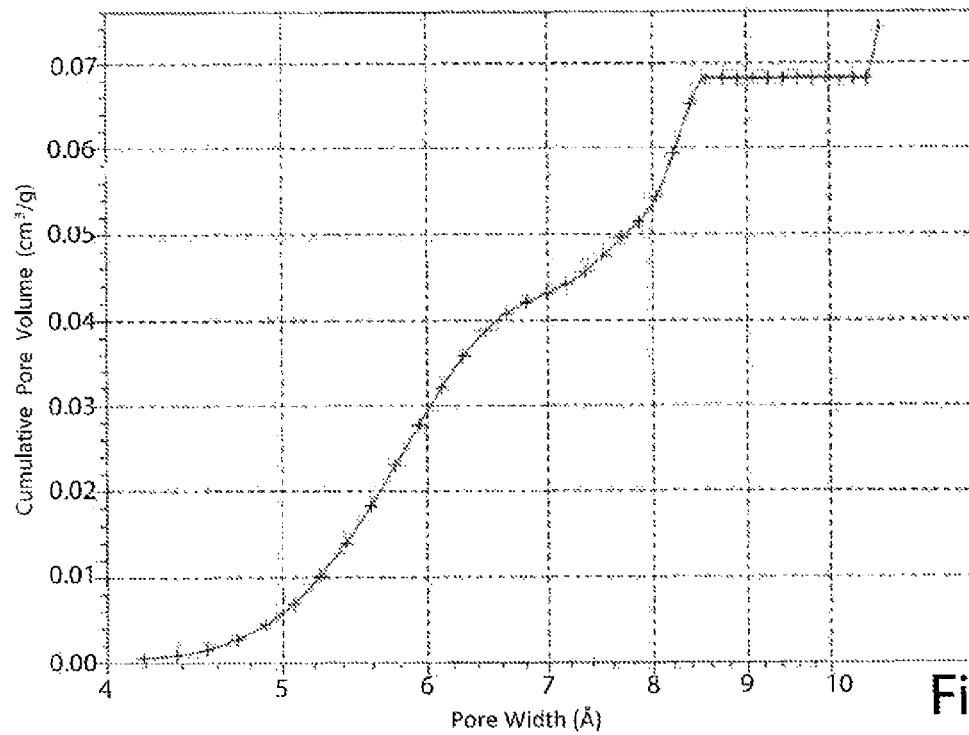
FIGS. 3a, 3b, 4a, 4b, 5a, 5b, 6a and 6b show characterizations of microporous material according to the disclosure and of comparative ones.
Figure 3B:
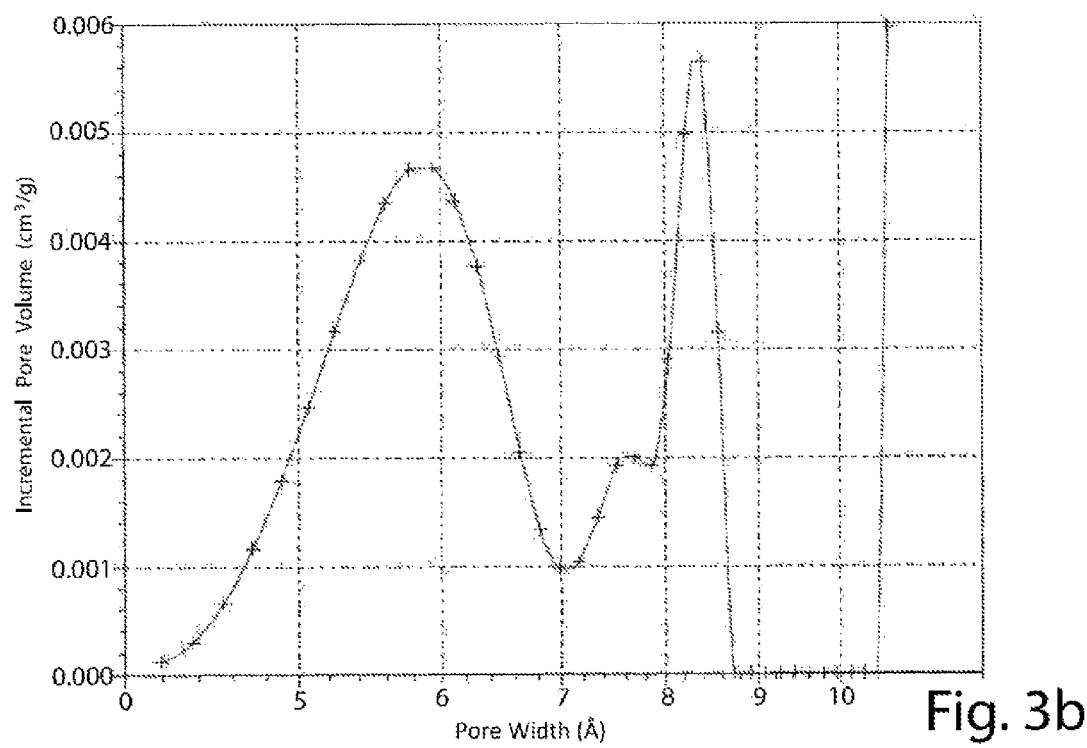
Figure 4A:
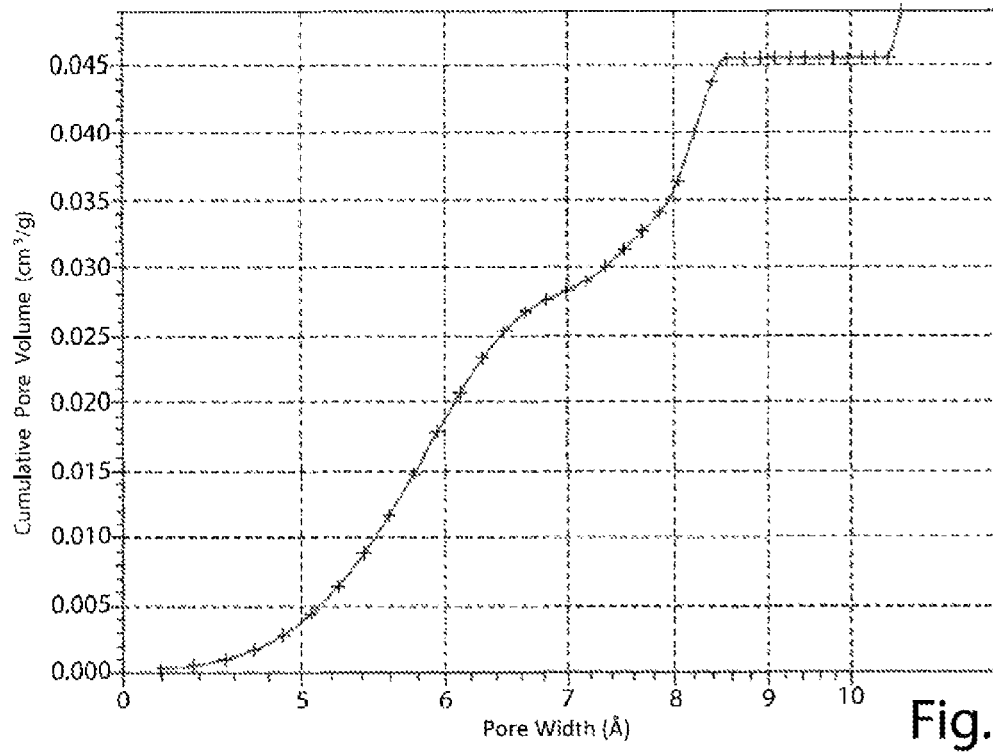
Figure 4B:
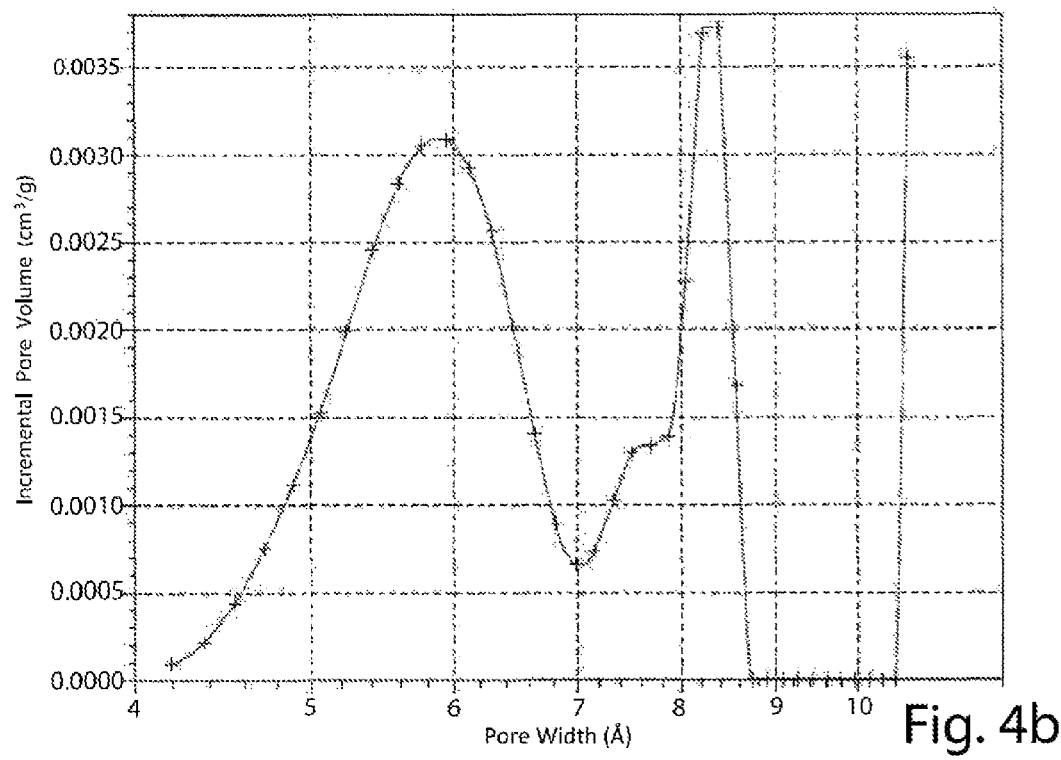

The results are shown in the attached FIG. 3a, 3b (material of Example 1), 4a, 4b (material of Example 2), 5a, 5b (material of Example 3), 6a and 6b (material of Example 4).

The graphs of FIGS. 3a, 4a, 5a and 6a reports the cumulative pore volume (cm3/g, in ordinate) versus pore diameter (Å, in abscissa) of each material tested. The graphs of FIGS. 3b, 4b, 5b and 6b reports the incremental pore volume (cm3/g, in ordinate) versus pore diameter (Å, in abscissa) of each material tested.

The materials of all of the Examples have a bimodal distribution, but that of Example 4 (FIG. 6b) has a first peak at about 5 Å, out of the range set forth by the present disclosure. In addition, none of its peaks has an incremental pore volume of at least $4 \times 10^{-3}$ cm$^3$/g. The material of Example 2 (FIG. 4b), though having both the first and second peaks at a diameter value according to the present disclosure, has one of these peaks (the first) with an incremental pore volume of lower than $4 \times 10^{-3}$ cm$^3$/g (at about $3.1 \times 10^{-3}$ cm$^3$/g). The materials of Examples 2 and 4 are comparative materials.

The materials of Examples 1 and 3 are according to the present disclosure in that they have a first peak at about 5.8 Å and a second peak at, respectively nearly 8.4 Å and about 8.2 Å. All of the first and second peaks of the materials of Examples 1 and 3 have an incremental pore volume of at least $4 \times 10^{-3}$ cm$^3$/g.

Figure 5A:
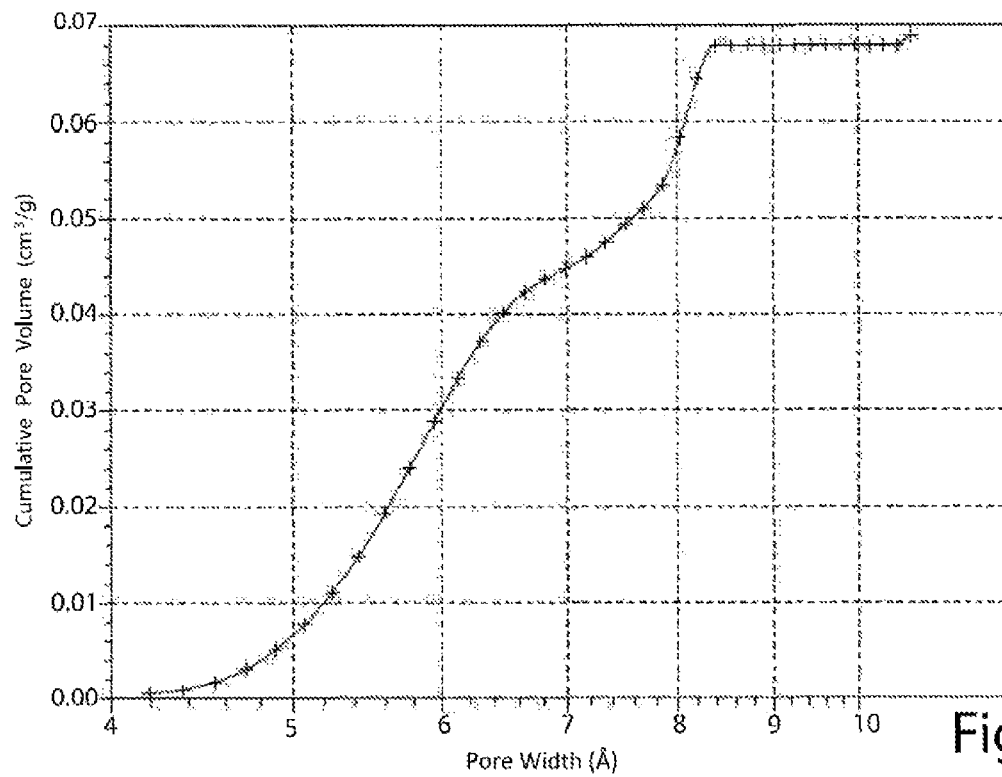
Figure 5B:
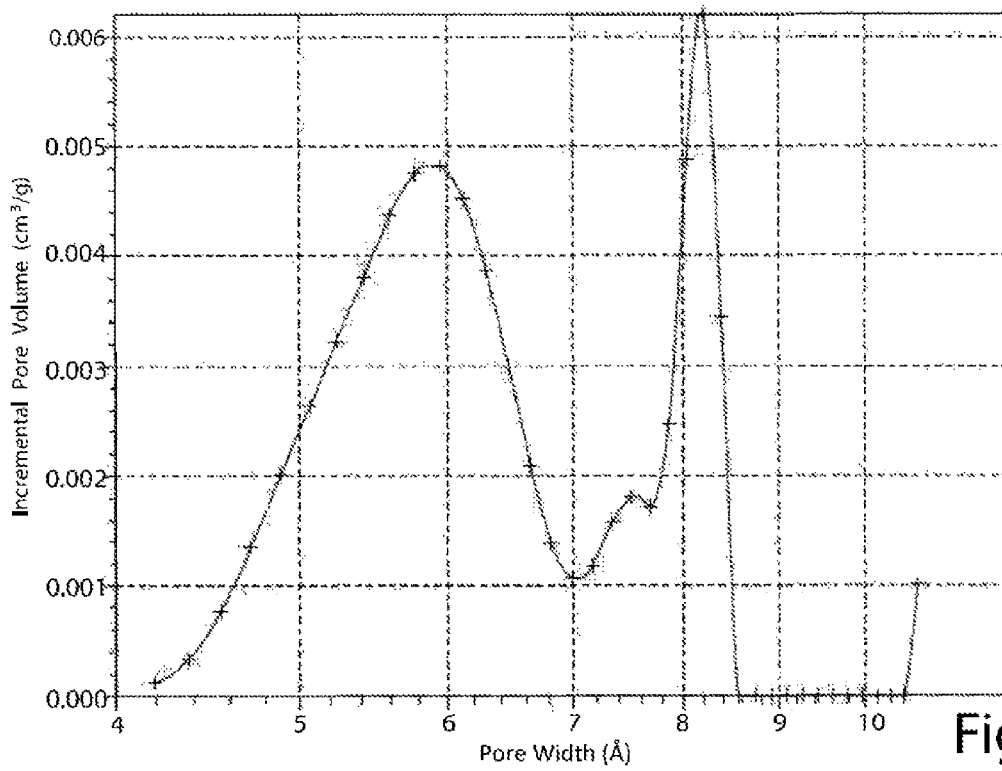
Figure 6A:
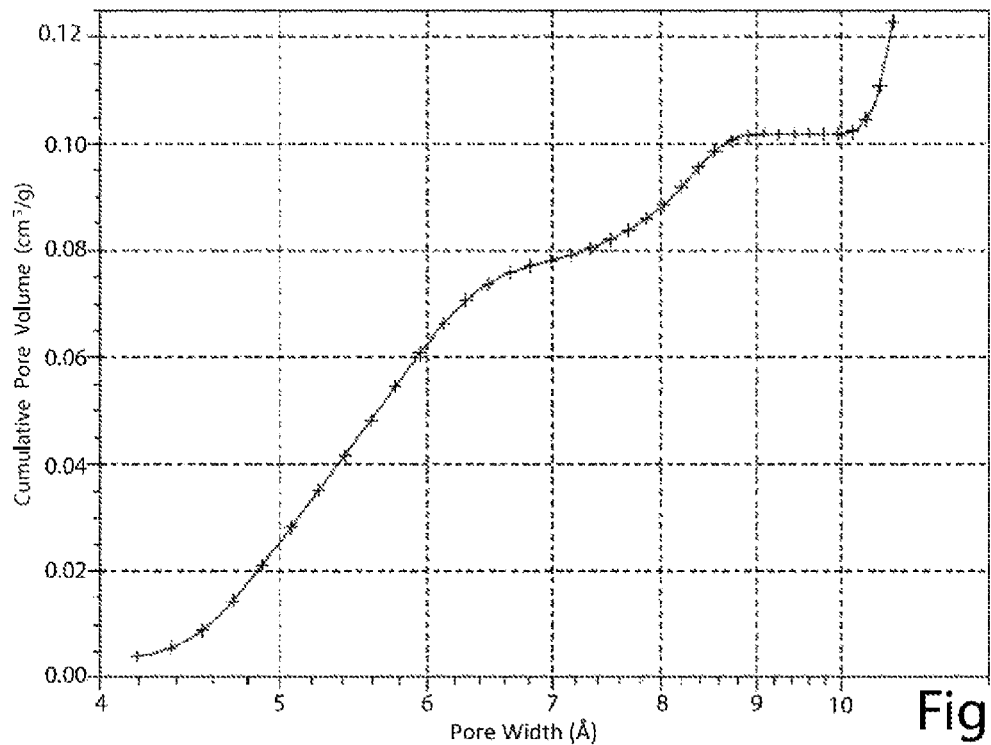
Figure 6B:
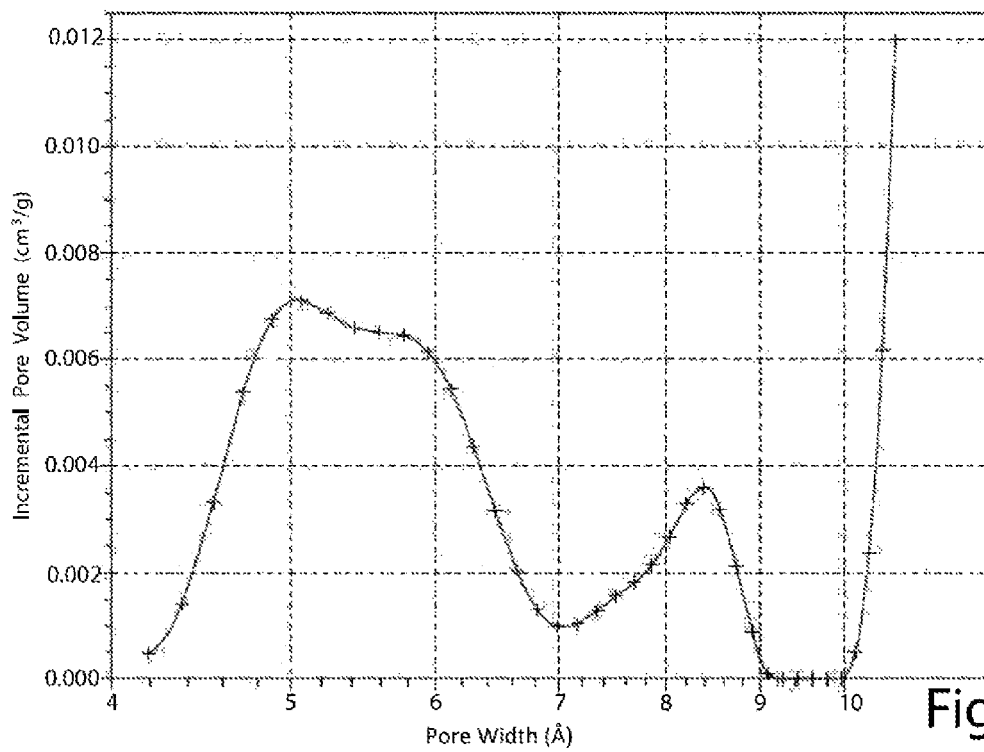

Only the materials of Examples 1 and 3 have a cumulative pore volume of the pores having a diameter up to 10 Å (1 nm) higher than $50 \cdot 10^{-3}$ cm$^3$/g (as from FIGS. 3a and 5a).

Methane Adsorption of the Materials of Examples 1-4
methane adsorption isotherms were determined at 1 bar and room temperature.
The results are reported in Table 1.

TABLE 1

| Example | Methane uptake as mmol/g (and cm$^3$/g) at 1 bar/25° C. |
|---|---|
| 1 | 0.7 (17.12) |
| 2* | 0.2 (4.89) |
| 3 | 1.1 (24.46) |
| 4* | 0.1 (2.45) |

The examples marked with an asterisk (*) are comparative.

The microporous materials of Examples 1 and 3 according to the present disclosure are suitable for irreversibly adsorbing methane in an amount allowing the elimination or at least the reduction of the crosslinked insulating layer degassing process. No methane desorption was detected. The microporous materials of Examples 1 and 3 have such methane adsorbing capacity at pressure and/or temperature suitable for treating an energy cable before putting it into operation.

The invention claimed is:

1. An energy cable, comprising a cable core comprising an electric conductor and a crosslinked electrically insulating layer, wherein the cable core further comprises a microporous material having a bimodal pore volume distribution with a first peak of the distribution having a maximum at a pore diameter value within the range 5.5-6.5 Å and a second peak of the distribution having a maximum at a pore diameter value within the range 7.5-8.5 Å, the maximum values of the first peak and the second peak corresponding to an incremental pore volume of at least $4 \times 10^{-3}$ cm$^3$/g.

2. The energy cable according to claim 1, wherein the second peak has a maximum value higher than the maximum value of the first peak.

3. The energy cable according to claim 1, wherein a cumulative pore volume of pores having a diameter up to 10 Å of the microporous material is equal to or higher than $50 \cdot 10^{-3}$ cm$^3$/g.

4. The energy cable according to claim 1, wherein the microporous material is selected from the group consisting of a hyper-crosslinked polymer, an activated carbon, an alumino-silicate, a metal-organic framework (MOF), a porous aromatic framework (PAF), a covalent organic framework (COF) and mixtures thereof.

5. The energy cable according to claim 4, wherein the microporous material is a hyper-crosslinked polymer comprising dichloroxylene (DCX) and 4,4'-bis(chloromethyl)-1,1'-biphenyl (BCMBP) as constitutional repeating units.

6. The energy cable according to claim 1, wherein the electric conductor comprises a plurality of stranded electrically conducting filaments and the microporous material is located within voids among said stranded electrically conducting filaments.

7. The energy cable according to claim 1, wherein the cable core comprises at least one semiconducting layer and the microporous material is into or in contact with the at least one semiconducting layer.

8. The energy cable according to claim 7, wherein:
the at least one semiconducting layer comprises an inner semiconducting layer and an outer semiconducting layer; and
the microporous material is into or in contact with the inner semiconducting layer.

9. The energy cable according to claim 1, wherein:
the electric conductor comprises a plurality of stranded electrically conducting filaments and the microporous material is located within voids among said stranded electrically conducting filaments; and
the cable core comprises at least one semiconducting layer and the microporous material is into or in contact with the at least one semiconducting layer.

10. The energy cable according to claim 9, wherein:
the at least one semiconducting layer comprises an inner semiconducting layer and an outer semiconducting layer; and
the microporous material is into or in contact with the inner semiconducting layer.

11. The energy cable according to claim 1, wherein the microporous material is in form of particles.

12. The energy cable according to claim 9, wherein the particles are dispersed into and/or on a substrate, said substrate including any of a filling material, a hygroscopic yarn or a hygroscopic tape.

13. A method for extracting methane from a crosslinked electrically insulating layer of an energy cable, the method comprising:
manufacturing an energy cable core comprising an electric conductor, a crosslinked electrically insulating layer containing methane as crosslinking by-product, and a microporous material having a bimodal pore volume distribution with a first peak having a maximum at a pore diameter value within the range 5.5-6.5 Å and a second peak having a maximum at a pore diameter value within the range 7.5-8.5 Å, the maximum values of the first and the second peaks corresponding to an incremental pore volume of at least $4 \times 10^{-3}$ cm$^3$/g; and then
leaving the energy cable core to stand for a period of from 0.5 to 7 days to allow the methane crosslinking by-product to migrate from the crosslinked electrically insulating layer to the microporous material and to be adsorbed in the microporous material.

14. The method according to claim 13, comprising a heating stage carried out during the stage of leaving the energy cable core to stand.

* * * * *